(12) United States Patent
Mano et al.

(10) Patent No.: US 12,211,146 B2
(45) Date of Patent: Jan. 28, 2025

(54) IMAGE PROCESSING DEVICE FOR COORDINATE MAPPING OF AN OMNIDIRECTIONAL IMAGE

(71) Applicant: SUZUKI MOTOR CORPORATION, Hamamatsu (JP)

(72) Inventors: Yuto Mano, Hamamatsu (JP); Takuma Yamazaki, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 187 days.

(21) Appl. No.: 18/125,854

(22) Filed: Mar. 24, 2023

(65) Prior Publication Data

US 2023/0351692 A1 Nov. 2, 2023

(30) Foreign Application Priority Data

Apr. 28, 2022 (JP) ................................ 2022-074793

(51) Int. Cl.
| | | |
|---|---|---|
| *G06T 15/04* | (2011.01) | |
| *G06T 7/60* | (2017.01) | |
| *G06T 17/05* | (2011.01) | |
| *G06T 17/20* | (2006.01) | |
| *G06V 10/74* | (2022.01) | |
| *G06T 15/10* | (2011.01) | |
| *G06T 19/00* | (2011.01) | |

(52) U.S. Cl.
CPC ............... *G06T 17/20* (2013.01); *G06T 7/60* (2013.01); *G06T 15/04* (2013.01); *G06T 17/05* (2013.01); *G06V 10/761* (2022.01); *G06T 15/10* (2013.01); *G06T 19/006* (2013.01)

(58) Field of Classification Search
CPC ........ G06T 15/04; G06T 17/05; G06T 19/006
See application file for complete search history.

(56) References Cited

U.S. PATENT DOCUMENTS

| 11,087,553 | B2 * | 8/2021 | Varshney | ................ H04L 51/52 |
| 2016/0360180 | A1 * | 12/2016 | Cole | .................... H04N 23/698 |
| 2019/0108611 | A1 * | 4/2019 | Izumi | ........................ G06T 3/12 |

FOREIGN PATENT DOCUMENTS

JP 2019133310 A 8/2019

* cited by examiner

*Primary Examiner* — Ryan McCulley
(74) *Attorney, Agent, or Firm* — TROUTMAN PEPPER HAMILTON SANDERS LLP (57) ABSTRACT

An image processing device includes a modeler that creates a spherical model having a reference point of a 3D virtual space as a center, and a horizontal plane model having a distance to the center of the spherical model set based on ground distance information; and a drawing part associating coordinate values of respective vertexes on the spherical model and coordinate values of respective vertexes on the horizontal plane model with coordinate values of the omnidirectional image, replaces the coordinate values of the omnidirectional image corresponding to the coordinate values of the respective vertexes on the horizontal plane model with coordinate values of the omnidirectional image that are set to respective intersections between respective direction vectors directed from the center of the spherical model to the respective vertexes, and the spherical model, and maps the omnidirectional image on the spherical model and the horizontal plane model to form a background image Imap for the 3D virtual space.

7 Claims, 9 Drawing Sheets

AT THE TIME OF IMAGING BY SPHERICAL CAMERA

IN FIRST EMBODIMENT

IN SECOND EMBODIMENT

IMAGE PROCESSING DEVICE FOR COORDINATE MAPPING OF AN OMNIDIRECTIONAL IMAGE

CROSS REFERENCE TO RELATED APPLICATION

The present application claims priority of Japanese Patent Application No. 2022-074793 filed Apr. 28, 2022. The entire contents of which are hereby incorporated by reference.

TECHNICAL FIELD

The present invention relates to an image processing device for forming a background image for a 3D virtual space.

BACKGROUND

As a technology to create a background for a virtual reality (VR) space in a simple way, there has been known a method of pasting an omnidirectional image imaged by a spherical camera or the like on a spherical 3D model. When a background image created with this method is displayed on a head-mounted display (HMD), a user wearing the HMD observes a 3D virtual space which seems as if an omnidirectional image is projected around the user.

For example, JP 2019-133310 A discloses an image processing device including: modeling means that forms a 3D mesh-shaped model by combining multiple mesh shapes corresponding to the features of an omnidirectional image; and drawing means that converts, based on a coordinate value of a virtual reference point set in a 3D space and coordinate values of respective pixels of the 3D mesh-shaped model, the coordinate values of the respective pixels into a coordinate system of the omnidirectional image, and maps the omnidirectional image on the 3D mesh-shaped model to form an omnidirectional three-dimensional image. According to this image processing device, it is possible to provide a virtual environment with an omnidirectional image with a three-dimensional feeling.

SUMMARY

When a background image in which an omnidirectional image is pasted only on a spherical 3D model is projected on the HMD, there is no information regarding an image at a position corresponding to the ground in the 3D virtual space observed by the user wearing the HMD, which gives a feeling of floating to the user. In above-described Patent Literature 1, a plane mesh-shaped model is formed to correspond to a horizontal plane (the ground) in the omnidirectional image, and the omnidirectional image is mapped on the 3D mesh-shaped model configured by combining the plane mesh-shaped model and a spherical mesh-shaped model, to thereby reduce the user's feeling of floating.

However, the plane mesh-shaped model of Patent Literature 1 is formed so as to correspond to the position of the horizontal plane in the omnidirectional image regardless of the distance between the ground and the imaging position at the time of actually imaging the omnidirectional image. Hence, when viewing an image of the ground mapped on the plane mesh-shaped model, the user might feel something strange about the distance to the ground in the 3D virtual space, which might decrease the sense of realism in the 3D virtual space and reduce the sense of immersion.

The present invention has been made in light of the above points, and it has an object to provide an image processing device capable of creating a background image having a high sense of immersion in a 3D virtual space, using an omnidirectional image.

In order to attain the above object, one aspect of the present invention provides an image processing device including: a storage part that stores an omnidirectional image acquired by imaging a reality space including a ground and a three-dimensional object by a spherical camera; a modeling part that forms a 3D model configured by combining multiple meshes based on features of the omnidirectional image stored in the storage part; and a drawing part that converts the coordinate values of the respective vertexes on the 3D model formed by the modeling part into a coordinate system of the omnidirectional image stored in the storage part based on a coordinate value of a reference point set in the 3D virtual space, and maps the omnidirectional image on the 3D model to form an omnidirectional three-dimensional image. In this image processing device, the storage part is configured to store ground distance information indicating a distance from an imaging position of the spherical camera to the ground. The modeling part is configured to form a spherical model having the reference point in the 3D virtual space as a center, and to form a horizontal plane model that is arranged downward when viewed from the center of the spherical model and has a distance to the center set based on the ground distance information stored in the storage part. The drawing part is configured to, based on the coordinate value of the reference point in the 3D virtual space, convert coordinate values of respective vertexes on the spherical model formed by the modeling part into a coordinate system of the omnidirectional image stored in the storage part, replace the coordinate values of the respective vertexes on the horizontal plane model formed by the modeling part with coordinate values of the converted coordinate system that are set to respective intersections between respective direction vectors directed from the center of the spherical model to the respective vertexes on the horizontal plane model, and the spherical model, and map the omnidirectional image on the spherical model and the horizontal plane model to form the omnidirectional three-dimensional image.

According to the image processing device of the present invention, since a user's feeling of strangeness about the distance to the ground in a 3D virtual space can be reduced, it is possible to create a background image with a high sense of immersion in the 3D virtual space, using an omnidirectional image.

DETAILED DESCRIPTION

Hereinafter, embodiments of the present invention will be described in detail with reference to the accompanying drawings.

Figure 1:
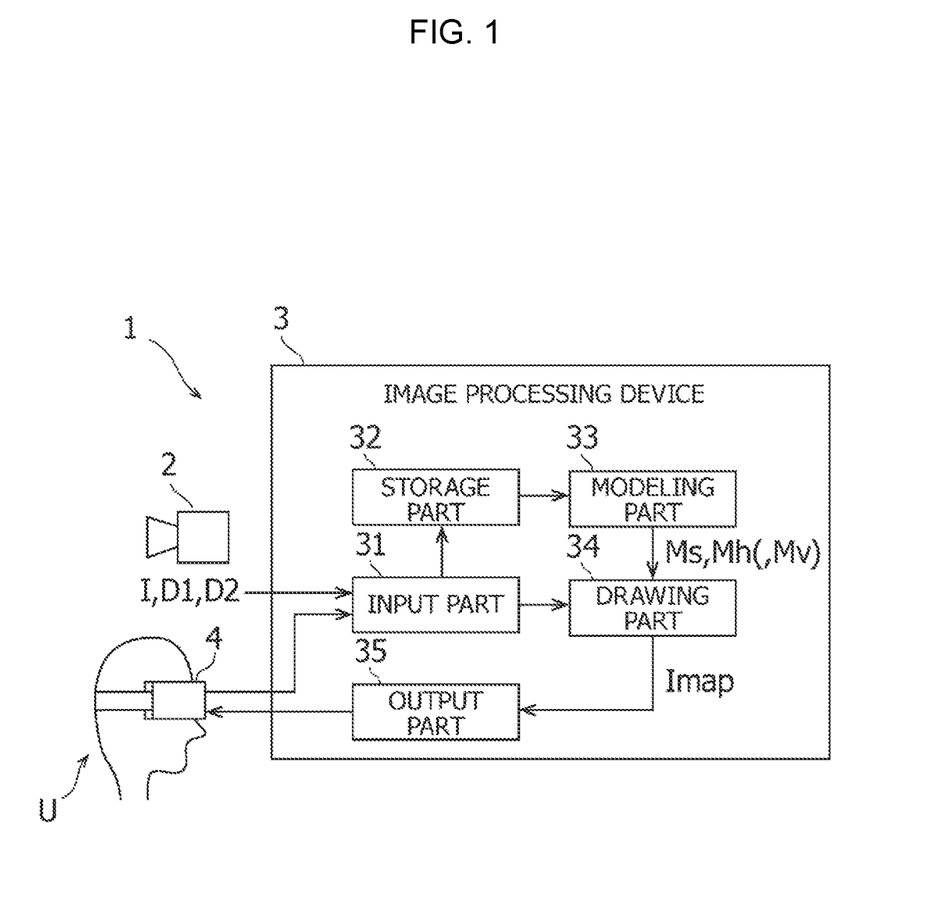
FIG. 1 is a block diagram showing a schematic configuration of a driving simulator system to which an image processing device according to the first embodiment of the present invention is applied.

FIG. 1 is a block diagram showing a schematic configuration of a driving simulator system to which an image processing device according to the first embodiment of the present invention is applied.

In FIG. 1, the driving simulator system 1 includes: a spherical camera 2 that images a reality space; an image processing device 3 according to the first embodiment that creates a background image Imap for a 3D virtual space using an omnidirectional image I imaged by the spherical camera 2; and a head-mounted display (HMD) 4 that displays the background image Imap created by the image processing device 3. This driving simulator system 1 can be used, for example, for a simulated experience of a vehicle driving in vehicle developments for automobiles or the like and in sales promotion activities.

The image processing device 3 includes: an input part 31, a storage part 32, a modeling part 33, a drawing part 34, and an output part 35, as function blocks thereof, for example. Although illustration of the hardware configuration of the image processing device 3 is omitted here, the image processing device 3 includes, for example, a computer system including a processor, a memory, a user input interface, and a communication interface. That is, in the image processing device 3, a function of each block is realized by reading and executing a program stored in the memory by the processor of the computer system.

The input part 31 is realized by the user input interface of the computer system, and includes, for example, a keyboard, a mouse, an operation controller, and others. The input part 31 also includes a receiver that receives information from the outside by wire or wirelessly, and functions as an external information input interface that receives information from an external computer or the like. The input part 31 is provided with an omnidirectional image I acquired by imaging the reality space by the spherical camera 2, and the omnidirectional image I is stored in the storage part 32. Note that the spherical camera 2 is also called an omnidirectional camera or a 360-degree camera.

The reality space imaged by the spherical camera 2 includes the ground, such as a road on which a vehicle travels and a sidewalk of the road, and three-dimensional objects such as buildings, traffic signals, traffic signs, and forests located around the road. At the time of imaging the omnidirectional image I, a distance D1 from an imaging position of the spherical camera 2 to the ground, and a distance D2 from the imaging position of the spherical camera 2 to a three-dimensional object are measured, and information indicating a measurement result is stored in the storage part 32 together with the omnidirectional image I via the input part 31. That is, the storage part 32 of the image processing device 3 is configured to be able to store the omnidirectional image I acquired by imaging the reality space including the ground and the three-dimensional object by the spherical camera 2, information indicating the distance D1 to the ground (hereinafter, referred to as "ground distance information"), and information indicating the distance D2 to the three-dimensional object (hereinafter, referred to as "three-dimensional object distance information"), the distances having been measured at the time of imaging the omnidirectional image I.

The modeling part 33 forms a 3D model, which is configured by combining multiple meshes based on the features of the omnidirectional image I stored in the storage part 32. Each of the multiple meshes configuring the 3D model has three or more vertexes, edges connecting the vertexes, and faces closed by the edges. The density of the multiple meshes is settable in accordance with the accuracy required for the 3D model. In the modeling part 33 of the first embodiment, as the 3D model including the above multiple meshes, a spherical model Ms and a horizontal plane model Mh corresponding to the ground are formed, for example.

Figure 2:
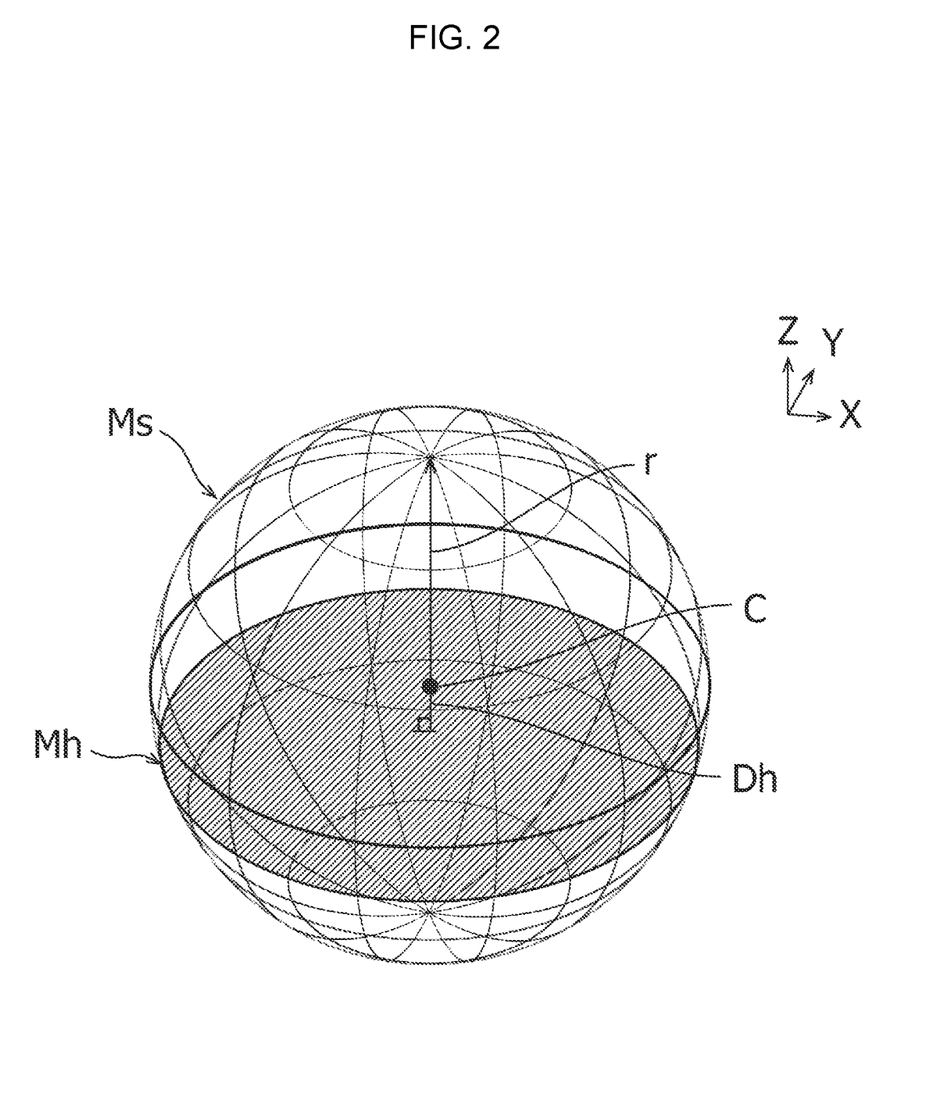
FIG. 2 is a conceptual diagram showing a 3D model (a spherical model and a horizontal plane model) formed by a modeling part in the first embodiment.

FIG. 2 is a conceptual diagram showing the spherical model Ms and the horizontal plane model Mh formed by the modeling part 33.

As shown in FIG. 2, the spherical model Ms is 3D model data configured by combining multiple meshes (not shown) into a spherical surface with a radius r, while a reference point set in a three-dimensional virtual space is set as a center C. The 3D virtual space is a virtual space provided to a user U who wears the HMD 4. The reference point of the 3D virtual space is set to correspond to the eye position of the user U in the 3D virtual space. The omnidirectional image I is mapped on the spherical model Ms with the center C set to the reference point of the 3D virtual space, and is projected on the HMD 4, to thereby allow the user U to observe the 3D virtual space from a viewpoint corresponding to the imaging position of the spherical camera 2. The setting of the radius r of the spherical model Ms will be described later.

The horizontal plane model Mh is 2D model data that is arranged downward when viewed from the center C of the spherical model Ms (the reference point of the 3D virtual space), as shown in a shaded region in FIG. 2, and has a plane extending generally in a horizontal direction, which is configured by combining multiple meshes. A distance Dh from the center C of the spherical model Ms to the horizontal plane model Mh, that is, a length of a perpendicular line extending downward from the center C of the spherical model Ms to the horizontal plane model Mh is set based on the ground distance information stored in the storage part 32.

Specifically, the distance Dh from the center C of the spherical model Ms to the horizontal plane model Mh is set to correspond to the distance D1 from the imaging position of the spherical camera 2 to the ground, which is indicated by the ground distance information. In other words, as the installation height of the spherical camera 2 from the ground at the time of imaging the omnidirectional image I becomes higher (or lower), the distance Dh from the center C of the spherical model Ms to the horizontal plane model Mh becomes longer (or shorter). The horizontal plane model Mh thus configured is combined with the spherical model Ms, to thereby generate 3D model data as a whole. The 3D model (the spherical model Ms and the horizontal plane model Mh) formed by the modeling part 33 is sent to the drawing part 34.

The drawing part 34 executes, based on the coordinate value of the reference point in the 3D virtual space, processing of associating coordinate values of respective vertexes on the spherical model Ms formed by the modeling part 33 with coordinate values of the omnidirectional image I stored in the storage part 32, and associating coordinate values of respective vertexes on the horizontal plane model Mh formed by the modeling part 33 with the coordinate values of the omnidirectional image I stored in the storage part 32. In addition, the drawing part 34 executes processing of replacing the coordinate values of the omnidirectional image I corresponding to the coordinate values of the respective vertexes on the horizontal plane model Mh with coordinate values of the omnidirectional image I that are set to respective intersections between respective direction vectors directed from the center C of the spherical model Ms to the respective vertexes on the horizontal plane model Mh, and the spherical model Ms. As a result, the drawing part 34 maps the omnidirectional image I on the spherical model Ms and the horizontal plane model Mh to form the background image Imap for the 3D virtual space, and outputs the background image Imap to the HMD 4 via the output part 35.

Figure 3:
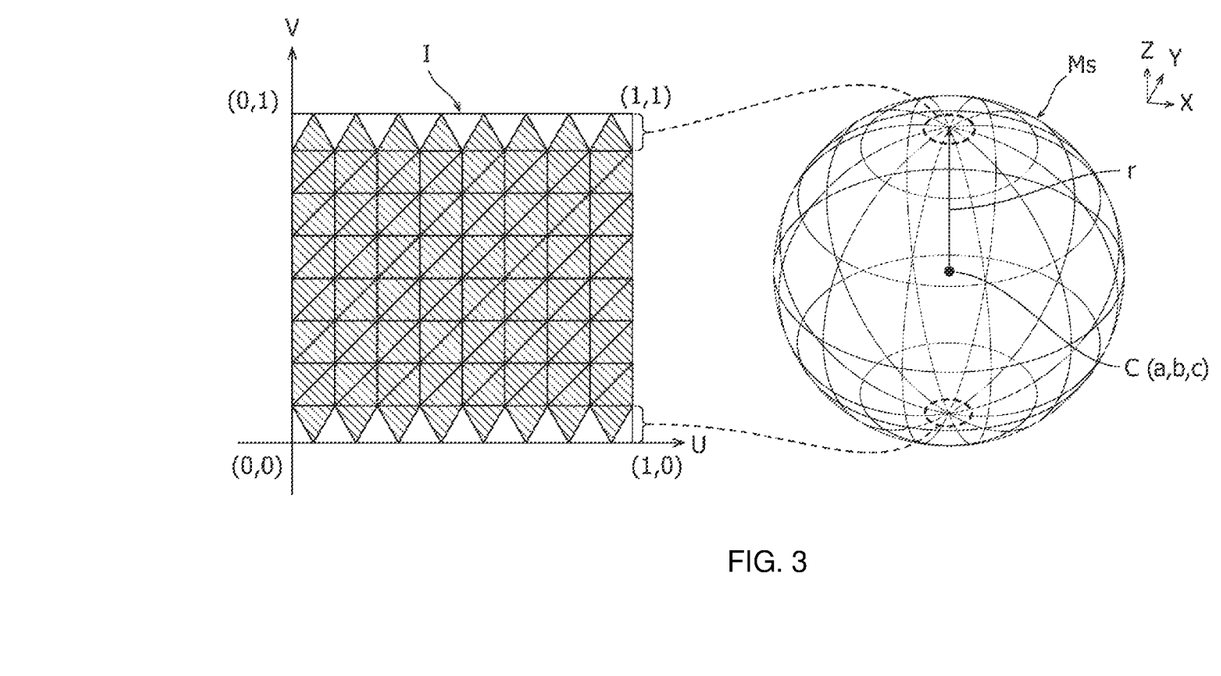
FIG. 3 is a conceptual diagram for explaining processing, executed by a drawing part in the first embodiment, of associating coordinate values of respective vertexes on the spherical model with coordinate values of an omnidirectional image.

FIG. 3 is a conceptual diagram for explaining the processing, executed by the drawing part 34, of associating the coordinate values of the respective vertexes on the spherical model Ms with the coordinate values of the omnidirectional image I.

As shown in the right part in FIG. 3, the respective vertexes (not shown) of multiple meshes configuring the spherical model Ms exist on a spherical surface with the radius r while the reference point of the 3D virtual space is set as the center C. In an orthogonal coordinate system including three X, Y, and Z axes that are mutually orthogonal (hereinafter referred to as an "XYZ coordinate system"), when the coordinate value of the reference point of the 3D virtual space is set to (a, b, c), the coordinate value (x, y, z) of each vertex on the spherical model Ms can be expressed by using a spherical equation: $(x-a)^2+(y-b)^2+(z-c)^2=r^2$.

In addition, as for the coordinate system of the omnidirectional image I, as shown in the left part in FIG. 3, when a texture (an image) is mapped on the 3D model, a UV coordinate system used for specifying a pasting position, direction, size, etc., is set. The omnidirectional image I in this UV coordinate system is mapped on the 3D model (the spherical model Ms and the horizontal plane model Mh) formed by the modeling part 33. That is, in the image mapped on the 3D model, coordinate values of the UV coordinate system are uniquely set with respect to the coordinate values of the XYZ coordinate system at the respective vertexes on the 3D model. In the first embodiment, the image mapped on the spherical model Ms has UV coordinate values set in a one-to-one relationship with respect to the XYZ coordinate values of the respective vertexes on the spherical model Ms, as described above. In addition, the image mapped on the horizontal plane model Mh has UV coordinate values set in a one-to-one relationship with respect to the XYZ coordinate values of the respective vertexes on the horizontal plane model Mh, as described later.

Specifically, in the image mapped on the spherical model Ms (the omnidirectional image I), the UV coordinate system, which is a 2D orthogonal coordinate system having a horizontal axis of U and a vertical axis of V, is set (the left part in FIG. 3). Vertexes in an equidistant grid pattern are set on the omnidirectional image I, and UV coordinate values of the respective vertexes are associated respectively with the XYZ coordinate values of the respective vertexes on the spherical model Ms. Each UV coordinate value is set within a range of 0 to 1 for each direction of the U axis and the V axis. By setting the vertexes in an equidistant grid pattern on the omnidirectional image I in the above manner, distortion in the omnidirectional image I to be pasted on the spherical model Ms is reduced. Note that, for convenience of creating the meshes on the spherical model Ms, in the vicinity of poles serving as endpoints (areas surrounded by dashed lines in the right part in FIG. 3), vertexes in a triangular wavy pattern rather than in a grid pattern are set in corresponding regions of the omnidirectional image I. Hence, in the vicinity of the poles of the spherical model Ms, slight areas that cannot be pasted on the spherical model Ms are generated in the omnidirectional image I. Hatched regions in the left part in FIG. 3 represent regions of the omnidirectional image I to be pasted on the spherical model Ms.

Figure 4:
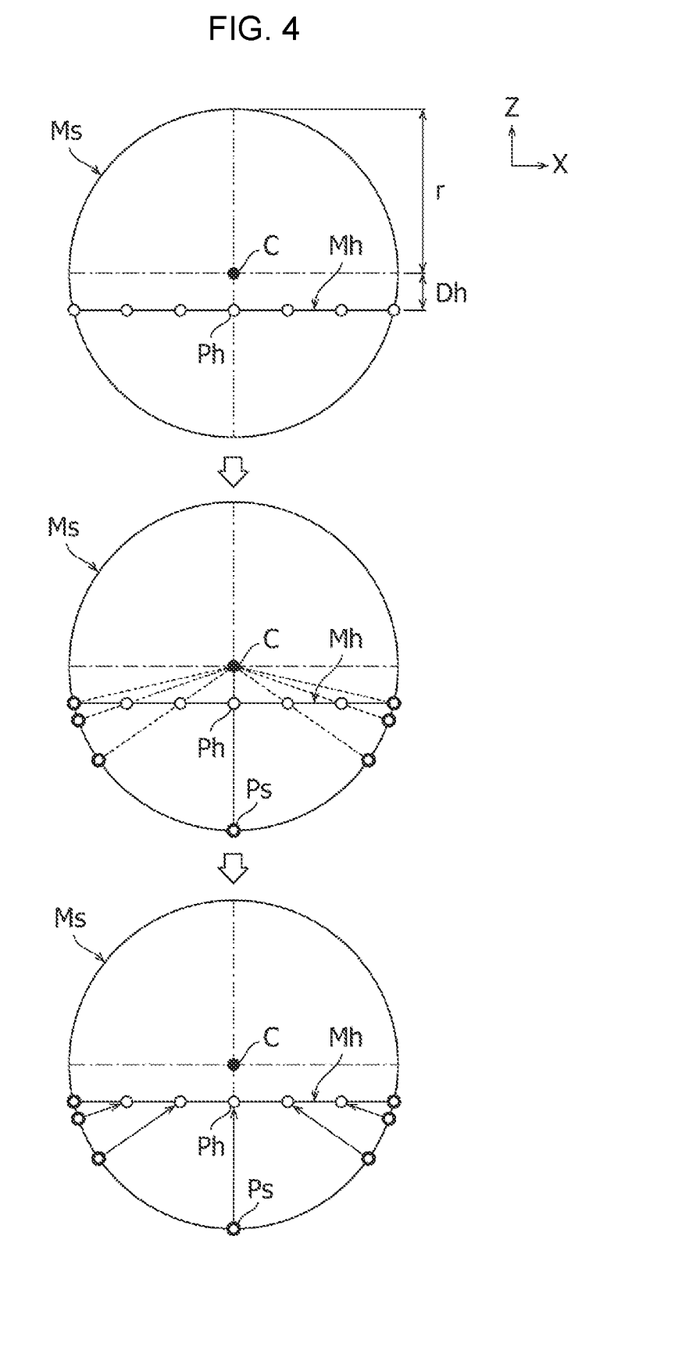
FIG. 4 is a conceptual diagram for explaining processing, executed by the drawing part in the first embodiment, of replacing UV coordinate values corresponding to coordinate values of respective vertexes on the horizontal plane model with UV coordinate values set on the spherical model.

FIG. 4 is a conceptual diagram for explaining processing, executed by the drawing part 34, of replacing the UV coordinate values corresponding to the coordinate values of the respective vertexes on the horizontal plane model Mh with the UV coordinate values set on the spherical model Ms. Note that FIG. 4 shows respective cross sections taken along the XZ plane of the spherical model Ms and the horizontal plane model Mh in FIG. 2.

As shown in the upper part in FIG. 4, the horizontal plane model Mh is provided at a position downward by the distance Dh from the center C of the spherical model Ms. Respective vertexes Ph (thin white circle marks) of the meshes configuring the horizontal plane model Mh are arranged on the horizontal plane model Mh. The coordinate value (x, y, z) of the XYZ coordinate system in the 3D virtual space is set to each vertex Ph on the horizontal plane model Mh. As described above, when the coordinate value of the reference point of the 3D virtual space is set to (a, b, c), the coordinate value of each vertex Ph in the Z-axis direction is expressed by $z=c-Dh$.

The image thus mapped on the horizontal plane model Mh has the UV coordinate values set in a one-to-one relationship with respect to the XYZ coordinate values of the respective vertexes on the horizontal plane model Mh, as described above. In the first embodiment, the drawing part 34 executes processing of replacing the UV coordinate values corresponding to the XYZ coordinate values of the respective vertexes on the horizontal plane model Mh with the UV coordinate values that are set to respective intersections between respective direction vectors directed from the center C of the spherical model Ms to the respective vertexes on the horizontal plane model Mh, and the spherical model Ms. In this processing, as shown in the middle part in FIG. 4, first, the drawing part 34 sets straight lines connecting the center C of the spherical model Ms and the respective vertexes Ph on the horizontal plane model Mh, and extends the straight lines in a radially outward direction (dotted lines in FIG. 4). These straight lines correspond to the direction vectors directed from the center C of the spherical model Ms to the respective vertexes Ph on the horizontal plane model Mh.

The drawing part 34 identifies respective intersections Ps (bold white circle marks) between the respective straight lines (direction vectors) and the spherical model Ms. The UV coordinate values of the omnidirectional image I mapped on the spherical model Ms are set to the respective intersections Ps. Then, the drawing part 34 acquires the UV coordinate value set to the respective intersections Ps, and replaces the UV coordinate values corresponding to the XYZ coordinate values of the respective vertexes Ph on the horizontal plane model with the acquired UV coordinate values, as shown in the lower part in FIG. 4. As for UV coordinate values corresponding to the XYZ coordinate values of some vertexes Ph among the respective vertexes Ph on the horizontal plane model Mh, these some vertexes Ph arranged in a region in which the spherical model Ms overlaps with the horizontal plane model Mh, those concerned UV coordinate values are replaced with UV coordinate values set to points on the spherical model Ms that coincide with these some vertexes Ph. Through the above series of processings, an image corresponding to the ground in the omnidirectional image I is pasted on the horizontal plane model Mh.

The background image Imap for the 3D virtual space thus formed by mapping the omnidirectional image I on the spherical model Ms and the horizontal plane model Mh by the drawing part 34 is sent to the output part 35 (FIG. 1) of the image processing device 3. The output part 35 outputs the background image Imap from the drawing part 34 to the HMD 4 using the communication interface of the computer system.

The HMD 4 is a well-known display device configured to project the background image Imap from the image processing device 3 as the background for the 3D virtual space so as to allow the user U to perceive a three-dimensional virtual space. As for the HMD 4, a head tracking function to detect a movement of the head of the user U and a position tracking function to detect a movement of the body of the user U may be realized by using sensors built in the HMD 4, or the like. Information on the movement of the user U detected by the above functions is transmitted to the drawing part 34 via the input part 31 of the image processing device 3, and is used for updating the background image Imap linked to the movement of the user U.

In the driving simulator system 1 to which the above-described image processing device 3 according to the first embodiment is applied, the background image Imap for the 3D virtual space is formed by mapping the omnidirectional image I that is acquired by imaging the reality space by the spherical camera 2 on the spherical model Ms and the horizontal plane model Mh by the image processing device 3, and the background image Imap is projected on the HMD 4. Accordingly, the user U wearing the HMD 4 can observe the background image Imap for the 3D virtual space projected on the HMD 4 from a viewpoint corresponding to the imaging position of the spherical camera 2.

At this time, since the distance Dh from the horizontal plane model Mh corresponding to the ground to the center C of the spherical model Ms (the reference point of the 3D virtual space) is set to correspond to the distance D1 from the imaging position of the spherical camera 2 to the ground at the time of imaging the omnidirectional image I, the user U who views the image of the ground mapped on the horizontal plane model Mh can have less of a feeling of strangeness about the distance to the ground in the 3D virtual space. Therefore, according to the image processing device 3 of the first embodiment, it is possible to create the background image with a high sense of immersion in the 3D virtual space, using the omnidirectional image I imaged by the spherical camera 2. In particular, by associating the XYZ coordinate values of the respective vertexes on the spherical model Ms and the horizontal plane model Mh with the UV coordinate values of the omnidirectional image I, it is possible to realize highly versatile mapping processing.

Next, the image processing device according to the second embodiment of the present invention will be described.

In the above-described image processing device 3 according to the first embodiment, there has been described the case in which the modeling part 33 forms the 3D model by combining the spherical model Ms and the horizontal plane model Mh corresponding to the ground. In the image processing device 3 according to the second embodiment, there will be described the case in which the modeling part 33 forms a vertical plane model Mv corresponding to a three-dimensional object, in addition to the spherical model Ms and the horizontal plane model Mh.

Figure 5:
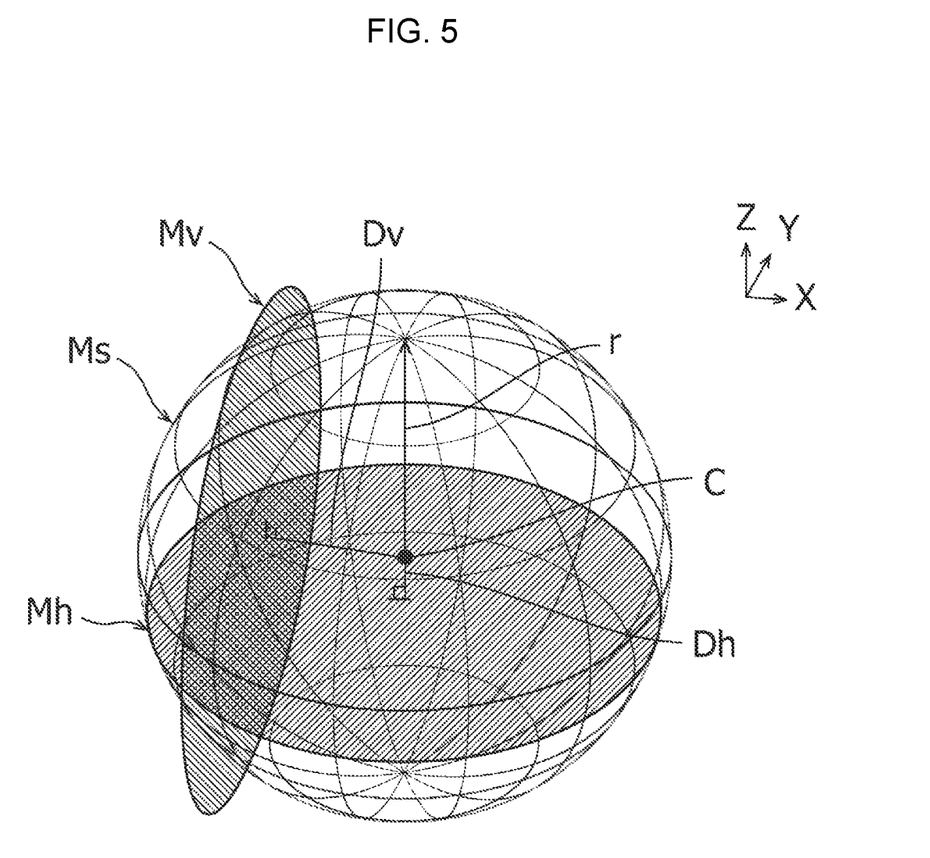
FIG. 5 is a conceptual diagram showing a 3D model (the spherical model, the horizontal plane model, and a vertical plane model) formed by the modeling part of the image processing device according to the second embodiment of the present invention.

FIG. 5 is a conceptual diagram showing a 3D model (the spherical model Ms, the horizontal plane model Mh, and the vertical plane model Mv) formed by the modeling part 33 in the second embodiment. Note that the function blocks of the image processing device 3 according to the second embodiment, and the configuration of the driving simulator system 1 to which the image processing device 3 according to the second embodiment is applied are the same as the configuration of the first embodiment shown in FIG. 1 described above and therefore, description thereof is omitted here.

As shown in FIG. 5, the modeling part 33 in the second embodiment forms the spherical model Ms and the horizontal plane model Mh in the same manner as in the first embodiment described above, and also forms the vertical plane model Mv corresponding to the three-dimensional object included in the omnidirectional image I. The vertical plane model Mv is, as shown in a shaded region in FIG. 5, 2D model data that is arranged in a lateral direction when viewed from the center C of the spherical model Ms (the reference point of the 3D virtual space) and has a plane extending generally in a vertical direction and configured by combining multiple meshes. In an example shown in FIG. 5, the vertical plane model Mv is spaced in the X-axis direction with respect to the center C of the spherical model Ms and is formed substantially parallel to the YZ plane. A distance Dv from the center C of the spherical model Ms to the vertical plane model Mv is set based on the three-dimensional object distance information stored in the storage part 32.

Specifically, the distance Dv from the center C of the spherical model Ms to the vertical plane model Mv is set to correspond to the distance D2 from the imaging position of the spherical camera 2 to the three-dimensional object, which is indicated by the three-dimensional object distance information. In other words, as the three-dimensional object becomes farther (or closer) from the installation position of the spherical camera 2 at the time of imaging the omnidirectional image I, the distance Dv from the center C of the spherical model Ms to the vertical plane model Mv becomes longer (or shorter). The vertical plane model Mv thus configured is combined with the spherical model Ms and the horizontal plane model Mh, to thereby create 3D model data as a whole. The 3D model (the spherical model Ms, the horizontal plane model Mh, and the vertical plane model Mv) formed by the modeling part 33 is sent to the drawing part 34.

In the same manner as in the above first embodiment, the drawing part 34 in the second embodiment executes processing of replacing the UV coordinate values corresponding to the XYZ coordinate values of the respective vertexes on the horizontal plane model Mh with the UV coordinate value set to respective intersections between respective direction vectors directed from the center C of the spherical model Ms to the respective vertexes on the horizontal plane model Mh, and the spherical model Ms, and also executes processing of replacing the UV coordinate values corresponding to the XYZ coordinate values of respective vertexes on vertical plane model My with the UV coordinate values set to respective intersections between respective direction vectors directed from the center C of the spherical model Ms to the respective vertexes on the vertical plane model Mv, and the spherical model Ms. Then, the drawing part 34 maps the omnidirectional image I on the spherical model Ms, the horizontal plane model Mh, and the vertical plane model My to form the background image Imap for the 3D virtual space, and outputs the background image Imap to the HMD 4 via the output part 35.

Figure 6:
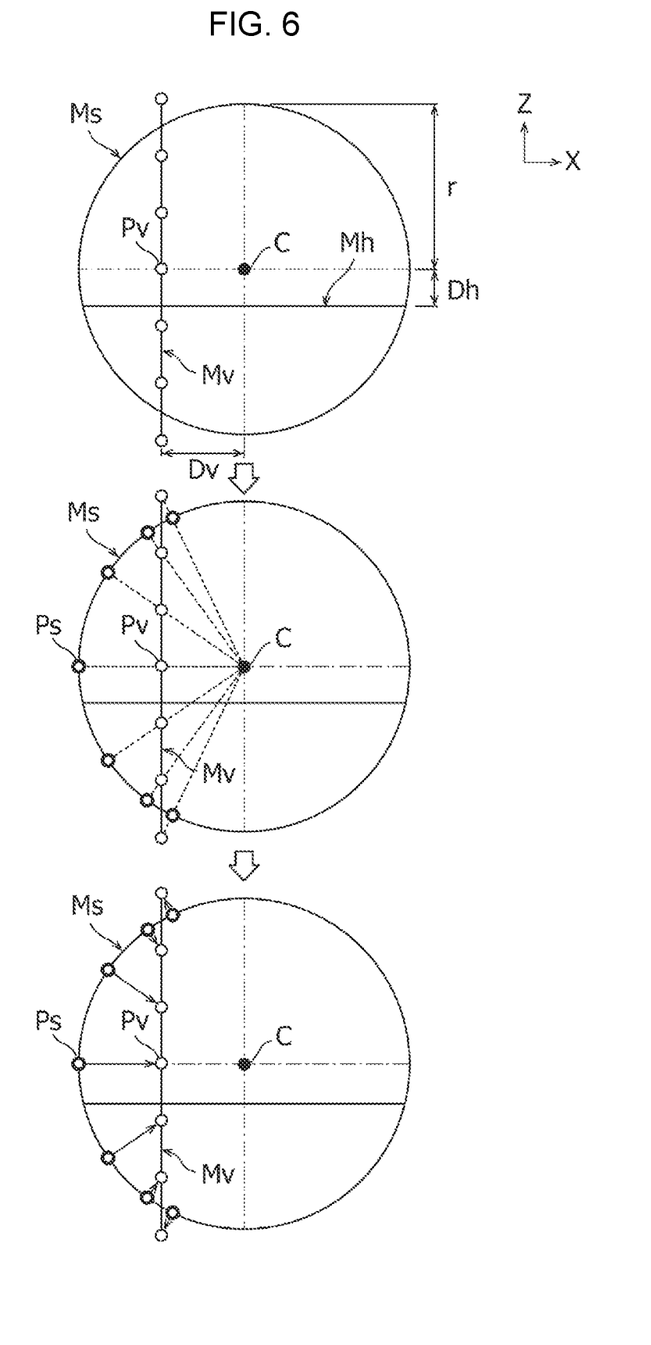
FIG. 6 is a conceptual diagram for explaining processing, executed by the drawing part in the second embodiment, of replacing UV coordinate values corresponding to coordinate values of respective vertexes on the vertical plane model with UV coordinate values set on the spherical model.

FIG. 6 is a conceptual diagram for explaining processing, executed by the drawing part 34 in the second embodiment, of replacing the UV coordinate values corresponding to the coordinate values of the respective vertexes on the vertical plane model Mv with the UV coordinate values set on the spherical model Ms. Note that FIG. 6 shows a cross section taken along the XZ plane of the spherical model Ms, the horizontal plane model Mh, and the vertical plane model Mv in FIG. 5.

As shown in the upper part in FIG. 6, the vertical plane model Mv is provided at a position apart by a distance Dv from the center C of the spherical model Ms in the lateral direction (the x-axis direction). Respective vertexes Pv (thin white circle marks) of the meshes configuring the vertical plane model Mv are arranged on the vertical plane model Mv. The coordinate value (x, y, z) of the XYZ coordinate system in the 3D virtual space is set to each vertex Pv on the vertical plane model Mv. As with the above first embodiment, when the coordinate value of the reference point of the 3D virtual space is set to (a, b, c), the coordinate value of each vertex Pv in the x-axis direction is expressed by x=a−Dv.

The image thus mapped on the vertical plane model Mv has the UV coordinate values set in a one-to-one relationship with respect to the XYZ coordinate values of the respective vertexes on the vertical plane model Mv. In the second embodiment, the drawing part 34 executes processing of replacing the UV coordinate values corresponding to the XYZ coordinate values of the respective vertexes on the vertical plane model Mv with the UV coordinate values set to respective intersections between respective direction vectors directed from the center C of the spherical model Ms to the respective vertexes on the vertical plane model Mv, and the spherical model Ms. In this processing, as shown in the middle part in FIG. 6, first, the drawing part 34 sets straight lines connecting the center C of the spherical model Ms respectively to the respective vertexes Pv on the vertical plane model Mv, and extends the straight lines in a radially outward direction (dotted lines in FIG. 6). These straight lines correspond to the direction vectors directed from the center C of the spherical model Ms to the respective vertexes Pv on the vertical plane model Mv.

The drawing part 34 identifies respective intersections Ps (bold white circle marks) between the respective straight lines (the direction vectors) and the spherical model Ms. The UV coordinate values of the omnidirectional image I mapped on the spherical model Ms are set to the respective intersections Ps. Therefore, the drawing part 34 acquires the UV coordinate value set to the respective intersections Ps, and replaces the UV coordinate values corresponding to the XYZ coordinate values of the respective vertexes Pv on the vertical plane model with the acquired UV coordinate values, as shown in the lower part in FIG. 6. As for UV coordinate values corresponding to the XYZ coordinate values of some vertexes Pv among the respective vertexes Pv on the vertical plane model Mv, these some vertexes Pv being arranged outward of the spherical model Ms, those concerning UV coordinate values are replaced with UV coordinate values set to intersections Ps on the spherical model Ms that are located on line segments connecting these some vertexes Pv and the center C of the spherical model Ms. Through the above series of processings, an image region corresponding to the three-dimensional object in the omnidirectional image I is pasted on the vertical plane model Mv.

Figure 7:
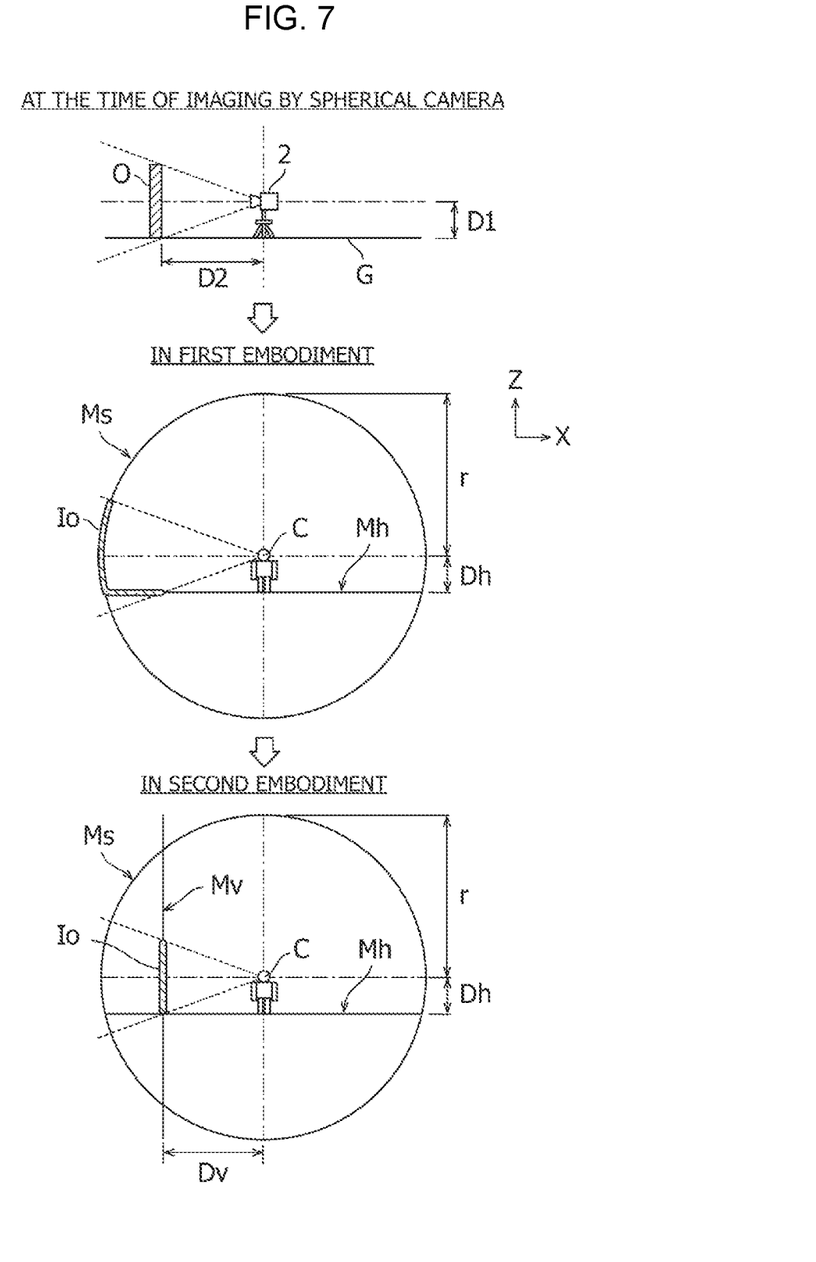
FIG. 7 is a conceptual diagram for explaining effects caused by the second embodiment.

In the driving simulator system 1 to which the above-described image processing device 3 according to the second embodiment is applied, the background image Imap for the 3D virtual space is formed by mapping the omnidirectional image I that is an image of the reality space imaged by the spherical camera 2 on the spherical model Ms, the horizontal plane model Mh, and the vertical plane model Mv by the image processing device 3 to form the background image Imap for the 3D virtual space, and the background image Imap is projected on the HMD 4. Since the vertical plane model Mv corresponding to the three-dimensional object is formed and the omnidirectional image I is mapped thereon, it is possible to create a background image for the 3D virtual space with less sense of discomfort. FIG. 7 is a conceptual diagram for explaining effects caused by the second embodiment.

As shown in the upper part and the middle part in FIG. 7, when the background image for the 3D virtual space is created using the omnidirectional image I acquired by imaging the reality space including the ground G and the three-dimensional object O by the spherical camera 2, in the case of the first embodiment in which only the spherical model Ms and the horizontal plane model Mh are formed, as the position of the three-dimensional object O becomes farther from the imaging position of the spherical camera 2, coarseness of the meshes of the 3D model on which an image Io of the three-dimensional object is pasted becomes more apparent, and the image Io of the three-dimensional object pasted on the horizontal plane model Mh may be distorted in accordance with the distance D2 from the three-dimensional object O to the imaging position. Such coarseness of the meshes and distortion of the image Io of the three-dimensional object can be reduced by preparing the vertical plane model Mv corresponding to the three-dimensional object, as shown in the lower part in FIG. 7. In particular, by setting the distance Dv from the vertical plane model Mv to the center C of the spherical model Ms to correspond to the distance D2 from the imaging position of the spherical camera 2 to the three-dimensional object O, it becomes possible to paste the image Io of the three-dimensional object on the vertical plane model Mv without distortion. Therefore, according to the image processing device 3 of the second embodiment, it is possible to create the background image with a higher sense of immersion in the 3D virtual space, using the omnidirectional image I imaged by the spherical camera 2.

Next, the image processing device according to the third embodiment of the present invention will be described.

In the above-described image processing device 3 according to the second embodiment, there has been described the case in which coarseness of the meshes and distortion of the image Io of the three-dimensional object are reduced by forming the vertical plane model Mv corresponding to the three-dimensional object. In the image processing device 3 according to the third embodiment, there will be described an example of adjusting the radius r of the spherical model Ms, instead of forming the vertical plane model Mv, to thereby realize the same effects as those in the second embodiment. Note that the function blocks of the image processing device 3 according to the third embodiment and the configuration of the driving simulator system 1 to which the image processing device 3 according to the third embodiment is applied are the same as the configuration of the first embodiment shown in FIG. 1 described above and therefore, description thereof is omitted here.

Figure 8:
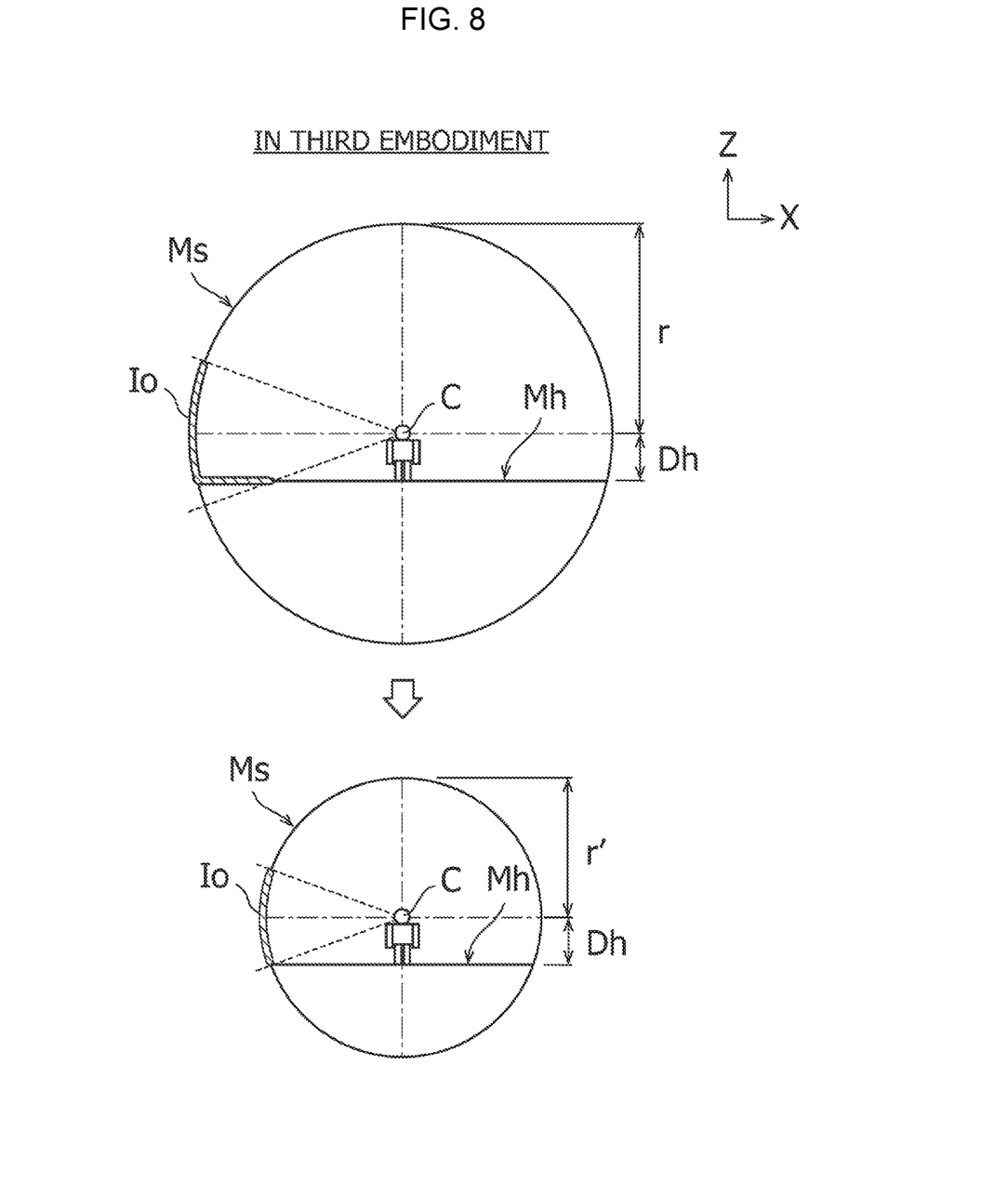
FIG. 8 is a conceptual diagram showing a cross section of the 3D model on which the omnidirectional image is pasted, in the third embodiment.

FIG. 8 is a conceptual diagram showing a cross section of the 3D model (the spherical model and the horizontal plane model) taken along the X-Z plane, the 3D model on which the omnidirectional image I is pasted in the third embodiment.

As shown in FIG. 8, in the image processing device 3 according to the third embodiment, in the case in which at least part of the image Io corresponding to the three-dimensional object in the background image Imap, formed by the drawing part 34 in the same manner as in the first embodiment described above, is mapped on the horizontal plane model Mh (the upper part in FIG. 8), the modeling part 33 adjusts the radius r of the spherical model Ms to r' based on the three-dimensional object distance information stored in the storage part 32 (in the lower part in FIG. 8). Through such an adjustment of the radius of the spherical model Ms to r', the image Io corresponding to the three-dimensional object in the omnidirectional image I is mapped only on the spherical model.

For example, assuming the case of creating a background for a 3D virtual space based on the driver's viewpoint of a vehicle traveling on a general urban road, the above-described adjustment of the radius of the spherical model Ms will be specifically described as follows: a minimum road width for a vehicle with a width of 2.5 m to travel is set to 6.5 m. If a driving orientation is located at a position about 1 m outward from the center in the width direction of this road, a distance from the viewpoint of the driver to an edge of the road is (6.5/2)−1.0=2.25 m. Furthermore, assuming that there is a sidewalk with a width of 1.0 m outside the road edge and that there is a three-dimensional object, such as a house, a building, and woods, ahead of the sidewalk, the distance from the viewpoint of the driver to the three-dimensional object is 2.25+1.0=3.25 m.

Hence, in the case of assuming that a vehicle traveling on a general urban road, it is preferable to set the adjusted radius r' of the spherical model Ms formed by the modeling part 33 to 3.25 m. By adjusting the radius of the spherical model Ms based on the width of the road on which the vehicle travels, in a typical driving scene on a general urban road, it is possible to project on the HMD 4 the background image Imap for the 3D virtual space that does not cause the driver to feel strangeness about the appearance of the surrounding three-dimensional object.

In addition, in the case in which the vehicle travels in an open space, such as a parking lot, it is preferable to set a distance to a three-dimensional object located closest to the spherical camera 2 to the radius r' of the spherical model Ms. That is, when a plurality of three-dimensional objects are included in the reality space imaged by the spherical camera 2, the distance from the imaging position of the spherical camera 2 to the three-dimensional object located closest to the spherical camera 2 among the plurality of three-dimensional objects is measured, and three-dimensional object minimum distance information indicating the distance is stored in the storage part 32 of the image processing device 3. When the radius of the spherical model Ms is adjusted by the modeling part 33, the radius r' of the spherical model Ms is set based on the three-dimensional object minimum distance information stored in the storage part 32.

By adjusting the radius of the spherical model Ms in this manner, in a typical driving scene on a general urban road, when the vehicle travels in an open space such as a parking lot, it is possible to project on the HMD 4 the background image Imap for the 3D virtual space that does not cause the driver to feel strangeness about the appearance of the surrounding three-dimensional object. It should be noted that if the adjusted radius r' of the spherical model Ms is too small, the horizontal plane model Mh corresponding to the ground is located outside the spherical model Ms, so that the 3D model used for creating the background for the 3D virtual space may become inappropriate.

Although the first to third embodiments of the present invention have been described above, the present invention is not limited to the above-described embodiments, and various modifications and changes can be made on the basis of the technical idea of the present invention. For example, in the first to third embodiments described above, although there has been exemplified an example of setting the UV coordinate system in the omnidirectional image I, a coordinate system other than the UV coordinate system may be set in the omnidirectional image I.

Figure 9:
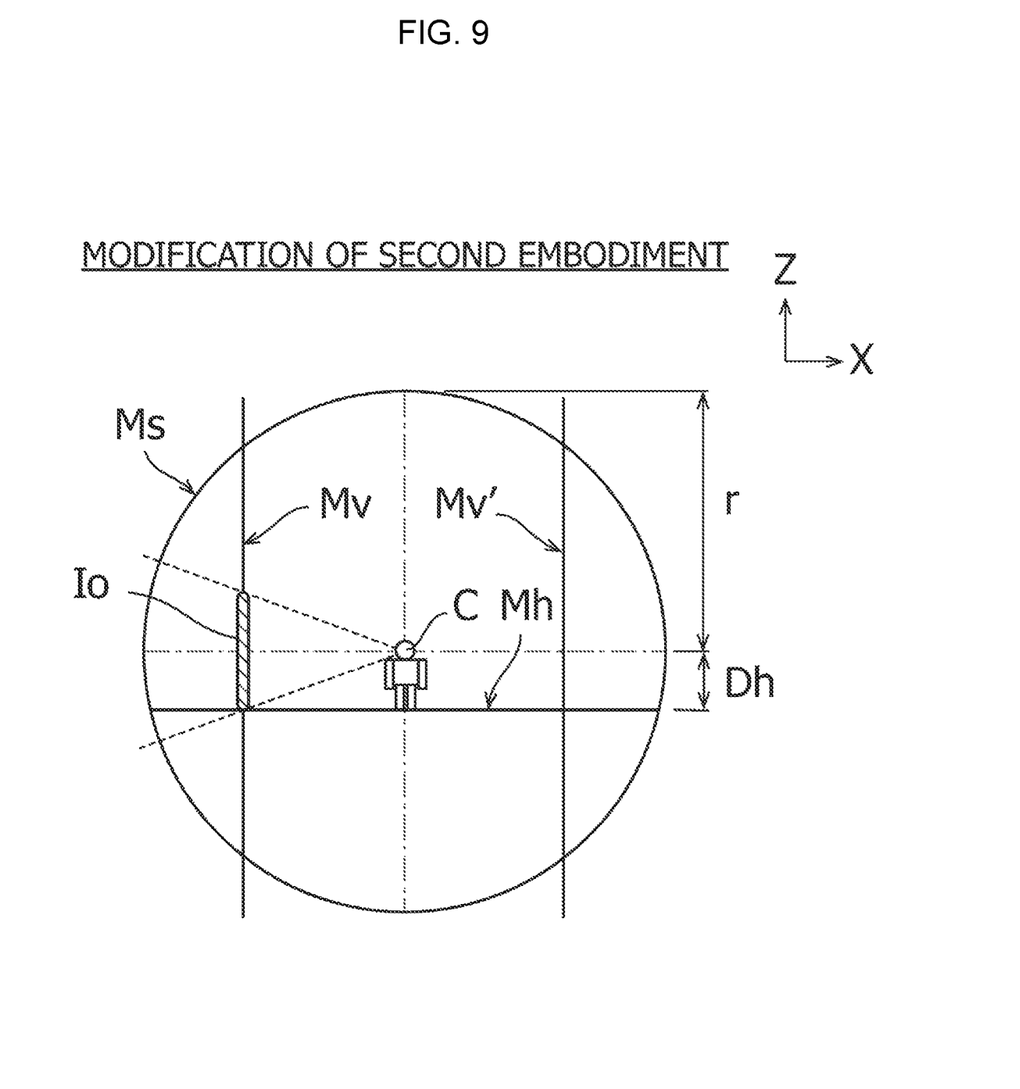
FIG. 9 is a conceptual diagram showing a modification related to the second embodiment.

In the second embodiment described above, although there has been described the case in which only one vertical plane model Mv corresponding to the three-dimensional object is formed, two or more vertical plane models Mv may be formed. As a specific example, in the case in which a three-dimensional object is placed only in the left-right direction of the road on which the vehicle travels in a tunnel, an urban area, or the like, as shown in FIG. 9, it may be configured such that, after the radius r of the spherical model Ms is set to an appropriate size, a vertical plane model Mv' similar to the vertical plane model Mv in the second embodiment described above is formed on the side opposite to the vertical plane model My across the center C of the spherical model Ms, and the omnidirectional image I is mapped on the left and right vertical plane models Mv, Mv'.

The invention claimed is:
1. An image processing device, comprising:
  a storage part that stores an omnidirectional image acquired by imaging a reality space including a ground and a three-dimensional object by a spherical camera;
  a modeling part that forms a 3D model configured by combining multiple meshes based on features of the omnidirectional image stored in the storage part; and
  a drawing part that maps the omnidirectional image stored in the storage part on the 3D model formed by the modeling part based on a coordinate value of a reference point set in a 3D virtual space so as to form a background image for the 3D virtual space, characterized in that
  the storage part is configured to store ground distance information indicating a distance from an imaging position of the spherical camera to the ground,
  the modeling part is configured to form a spherical model having the reference point in the 3D virtual space as a center, and to form a horizontal plane model that is arranged downward when viewed from the center of the spherical model and has a distance to the center set based on the ground distance information stored in the storage part, and the drawing part is configured to, based on the coordinate value of the reference point in the 3D virtual space, associate coordinate values of respective vertexes on the spherical model formed by the modeling part with coordinate values of the omnidirectional image stored in the storage part, associate coordinate values of respective vertexes on the horizontal plane model formed by the modeling part with the coordinate values of the omnidirectional image stored in the storage part, and replace the coordinate values of the omnidirectional image corresponding to the coordinate values of the respective vertexes on the horizontal plane model with coordinate values of the omnidirectional image that are set to respective intersections between respective direction vectors directed from the center of the spherical model to the respective vertexes on the horizontal plane model, and the spherical model so as to map the omnidirectional image on the spherical model and the horizontal plane model to form the background image for the 3D virtual space.

2. The image processing device according to claim 1, wherein
a UV coordinate value in a UV coordinate system is set to each pixel of the omnidirectional image, and
the drawing part is configured to set the UV coordinate values of the omnidirectional image corresponding to the coordinate values of the respective vertexes depending on a positional relationship of the reference point in the 3D virtual space with respect to the respective vertexes on the spherical model and the respective vertexes on the horizontal plane model, to extend straight lines connecting the center of the spherical model respectively to the respective vertexes on the horizontal plane model in a radially outward direction, to acquire UV coordinate values set to respective intersections between the respective straight lines and the spherical model, and to replace the UV coordinate values of the omnidirectional image corresponding to the coordinate values of the respective vertexes on the horizontal plane model with the acquired UV coordinate values.

3. The image processing device according to claim 1, wherein
the storage part is configured to store three-dimensional object distance information indicating a distance from the imaging position of the spherical camera to the three-dimensional object,
the modeling part is configured to form a vertical plane model that is arranged in a lateral direction when viewed from the center of the spherical model and is set based on the three-dimensional object distance information including the distance to the center stored in the storage part, and
the drawing part is configured to, based on the coordinate value of the reference point in the 3D virtual space, associate coordinate values of respective vertexes on the vertical plane model formed by the modeling part with the coordinate values of the omnidirectional image stored in the storage part, replace the coordinate values of the omnidirectional image corresponding to the coordinate values of the respective vertexes on the vertical plane model with coordinate values of the omnidirectional image that are set to respective intersections between respective direction vectors directed from the center of the spherical model to the respective vertexes on the vertical plane model, and the spherical model so as to map the omnidirectional image on the spherical model, the horizontal plane model, and the vertical plane model to form the background image for the 3D virtual space.

4. The image processing device according to claim 3, wherein
a UV coordinate value in a UV coordinate system is set to each pixel of the omnidirectional image, and
the drawing part is configured to, depending on a positional relationship of the reference point in the 3D virtual space with respect to respective vertexes on the spherical model, respective vertexes on the horizontal plane model, and respective vertexes on the vertical plane model, set UV coordinate values of the omnidirectional image corresponding to the coordinate values of the respective vertexes, extend straight lines connecting the center of the spherical model respectively to the respective vertexes on the horizontal plane model and the respective vertexes on the vertical plane model in a radially outward direction, acquire UV coordinate values set to respective intersections between the respective straight lines and the spherical model, and replace the UV coordinate values of the omnidirectional image corresponding to the coordinate values of the respective vertexes on the horizontal plane model and the coordinate values of the respective vertexes on the vertical plane model with the acquired UV coordinate values.

5. The image processing device according to claim 3, wherein
when at least part of an image corresponding to the three-dimensional object in the background image formed by the drawing part is mapped on the horizontal plane model, the modeling part is configured to adjust a radius of the spherical model based on the three-dimensional object distance information stored in the storage part so as to entirely map the image corresponding to the three-dimensional object on the spherical model.

6. The image processing device according to claim 5, wherein
the modeling part is configured to adjust the radius of the spherical model based on a width of a road on which a vehicle travels.

7. The image processing device according to claim 5, wherein
when images of multiple three-dimensional objects are included in the omnidirectional image, the storage part is configured to store three-dimensional object minimum distance information indicating a distance from the imaging position of the spherical camera to an object located closest to the spherical camera among the multiple three-dimensional objects, and
the modeling part is configured to adjust the radius of the spherical model based on the three-dimensional object minimum distance information that is stored in the storage part.

* * * * *